United States Patent
Ueda et al.

(10) Patent No.: US 12,268,196 B2
(45) Date of Patent: Apr. 8, 2025

(54) FISH COUNTING SYSTEM, FISH COUNTING METHOD, AND PROGRAM

(71) Applicant: Yanmar Power Technology Co., Ltd., Osaka (JP)

(72) Inventors: Yasuhiro Ueda, Osaka (JP); Yuichiro Dake, Osaka (JP); Toshiaki Sakai, Itami (JP); Makoto Tani, Itami (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 156 days.

(21) Appl. No.: 17/764,031

(22) PCT Filed: Sep. 15, 2020

(86) PCT No.: PCT/JP2020/034936
§ 371 (c)(1),
(2) Date: Mar. 25, 2022

(87) PCT Pub. No.: WO2021/060077
PCT Pub. Date: Apr. 1, 2021

(65) Prior Publication Data
US 2022/0386571 A1     Dec. 8, 2022

(30) Foreign Application Priority Data
Sep. 27, 2019   (JP) ................................. 2019-177649

(51) Int. Cl.
*A01K 61/95*   (2017.01)
*G06T 1/00*    (2006.01)

(52) U.S. Cl.
CPC ............ *A01K 61/95* (2017.01); *G06T 1/0007* (2013.01); *G06T 2207/30242* (2013.01)

(58) Field of Classification Search
CPC ................................ A01K 61/95; A01K 61/90
See application file for complete search history.

(56) References Cited

U.S. PATENT DOCUMENTS

| | | | | |
|---|---|---|---|---|
| 5,692,064 A | * | 11/1997 | Takagi | ...................... G06K 9/00 382/103 |
| 2011/0114029 A1 | * | 5/2011 | Chu | ....................... A01K 61/00 119/215 |

(Continued)

FOREIGN PATENT DOCUMENTS

| | | |
|---|---|---|
| JP | 2005202674 A | 7/2005 |
| JP | 2010-181920 A | 8/2010 |

(Continued)

OTHER PUBLICATIONS

International Search Report dated Nov. 24, 2020 issued in corresponding PCT Application PCT/JP2020/034936 cites the patent documents above.

(Continued)

*Primary Examiner* — Joshua J Michener
*Assistant Examiner* — Henry Hooper Mudd
(74) *Attorney, Agent, or Firm* — NORTON ROSE FULBRIGHT US LLP (57) ABSTRACT

A fish counting system has: an image acquisition unit for acquiring a plurality of images wherein a fluid containing fish is imaged over time; a counting unit for counting the fish on the basis of the plurality of images; a fish count change display provision unit for providing a fish count change display, wherein a display corresponding to the number of fish counted per unit time is arranged in a time-series manner; a result provision unit for providing a counting result display wherein an image to which count completion marks indicating a counted fish have been added; and a correction unit for receiving a correction operation and correcting the number of fish.

11 Claims, 7 Drawing Sheets

(56) References Cited

U.S. PATENT DOCUMENTS

2017/0293217 A1* 10/2017 Gallager ............... G03B 41/00
2018/0263223 A1     9/2018 Kodaira et al.
2021/0060558 A1*  3/2021 Brubacher ............. B01L 3/00
2022/0245555 A1*  8/2022 Prytz ..................... G06Q 10/06
2022/0254182 A1*  8/2022 Livne .................... G06V 40/10

FOREIGN PATENT DOCUMENTS

WO      2017/164239 A1   9/2017
WO       2019002880 A1   1/2019

OTHER PUBLICATIONS

European Search Report dated Sep. 15, 2023 issued in EP Application No. 20867935.7.

* cited by examiner

FISH COUNTING SYSTEM, FISH COUNTING METHOD, AND PROGRAM

CROSS-REFERENCE TO RELATED APPLICATIONS

This application is a national stage application pursuant to 35 U.S.C. § 371 of International Application No. PCT/JP2020/034936, filed on Sep. 15, 2020 which claims priority under 35 U.S.C. § 119 to Japanese Patent Application No. 2019-177649 filed on Sep. 27, 2019, the disclosures of which are hereby incorporated by reference in their entireties.

TECHNICAL FIELD

The present disclosure relates to a fish counting system, a fish counting method, and a program.

BACKGROUND ART

It is desirable to accurately determine the number of fish in cultivation of tuna and other fish to reduce feed costs and planed production. In general, fish are counted by transferring the fish from a first fish tank to a second fish tank and photographing the transferring fish. A number of fish are visually counted while a recorded moving image is slowly reproduced, and therefore, man-hour is increased and accuracy is deteriorated.

Patent Literature 1 discloses a system for counting fish passing through a fishway in a river or the like using a plurality of cameras.

CITATION LIST

Patent Literature

Patent Literature 1: Japanese Unexamined Patent Application Publication No. 2005-202674

DISCLOSURE OF INVENTION

Problems to be Solved by the Invention

However, accuracy of counting using a camera may fluctuate depending on a change in an imaging environment, such as a direction of the sun or the turbidity of water. In addition, miscounting may occur due to overlapping fish when a large number of fish move at the same time.

Therefore, it is preferable that a counting result is manually corrected since the fish may be incorrectly counted. However, it is cumbersome to visually check an entire moving image taken over a long period of time to see whether miscounting has occurred and man-hour is increased.

The present disclosure provides a fish counting system, a fish counting method, and a program that can easily correct miscounting.

Means for Solving the Problems

A fish counting system according to the present disclosure includes an image acquisition unit that acquires a plurality of images of a fluid including fish captured over time, a counting unit that counts the number of fish based on the plurality of images, a fish count change display provision unit that provides a fish count change display in which indication corresponding to the number of fish counted per unit time is arranged in a time series, a result provision unit that provides a counting result display including an image with a count completion mark indicating a counted fish, and a correction unit that accepts a correction operation and corrects the number of fish.

Effect of the Invention

Miscounting is most likely to occur when a large number of fish are passing through at once, and therefore, the number of fish counted per unit time is large. This configuration provides a fish count change display in which indication corresponding to the number of fish counted per unit time is arranged on a time-series basis. Accordingly, a time point when miscounting is likely to be performed since a large number of fish pass at once may be recognized without visually inspecting images for all the time. Then, a counting result display including an image with a count completion mark indicating the counted fish is visually checked so that correction is enabled by a correction operation. Accordingly, miscounting may be easily corrected.

DESCRIPTION OF EMBODIMENTS

Hereinafter, an embodiment of the present disclosure will be described with reference to the drawings.

Figure 1:
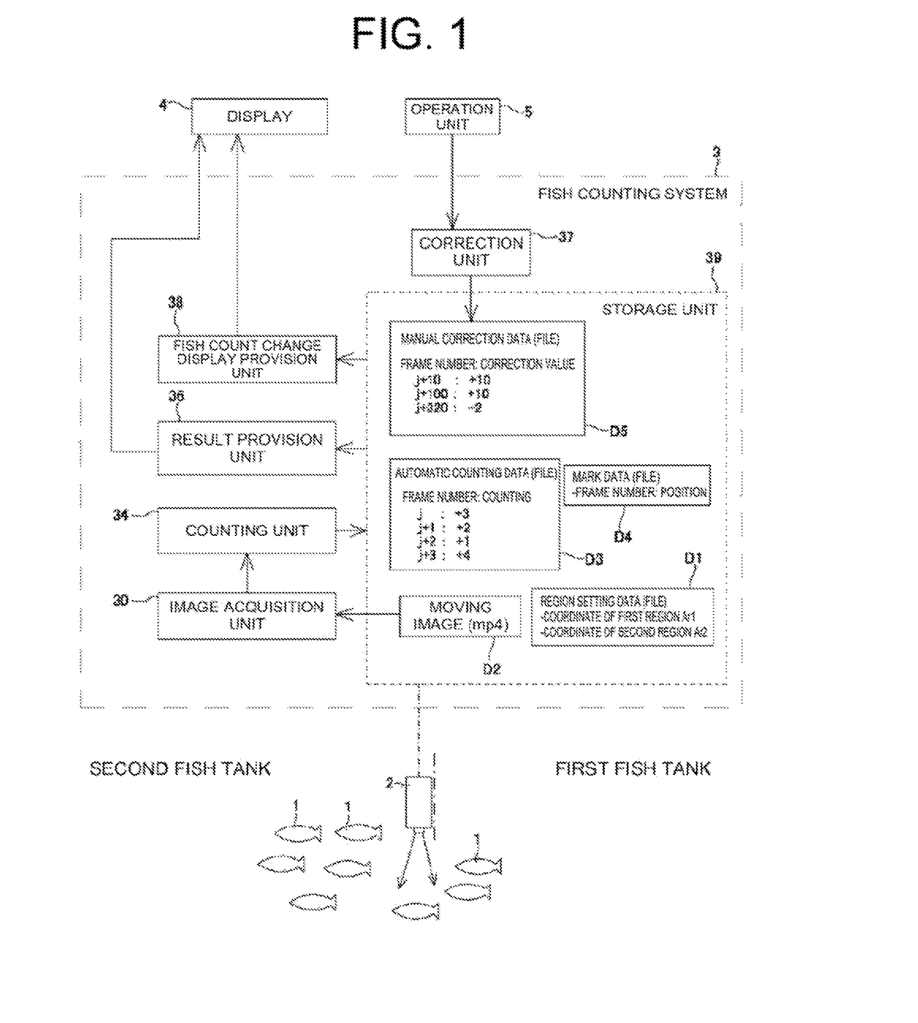
FIG. 1 is a block diagram illustrating a fish counting system of this embodiment.

As shown in FIG. 1, a fish counting system 3 is configured such that the number of fish is counted based on a plurality of images, an indication of a counting result is provided for a provision destination, such as a display 4, and a correction operation is accepted through an operation unit 5 to correct the number of fish. The plurality of images are obtained by using a camera 2 capturing images over time of an imaging region in which fluid including fish 1 flows. FIG. 1 is an example in which a first fish tank and a second fish tank are directly connected, and fish, such as tuna, are transferred from the first fish tank to the second fish tank. By installing a camera near an inlet of the second fish tank, fish that are moved into the second fish tank are counted to determine the total number of fish. Note that an installation direction of the camera is not limited to the example shown in FIG. 1. For example, the camera may be installed at an outlet of the first fish tank.

Note that, in this embodiment, the fish counting system 3 is realized in a computer to which the display 4 and the operation unit 5 (touch panel, mouse, or other devices) are connected, but is not limited thereto. For example, the fish counting system 3 may be implemented in a server or a cloud, and the display 4 and the operation unit 5 of a computer capable of communicating with the server or the cloud may be used.

Figure 2:
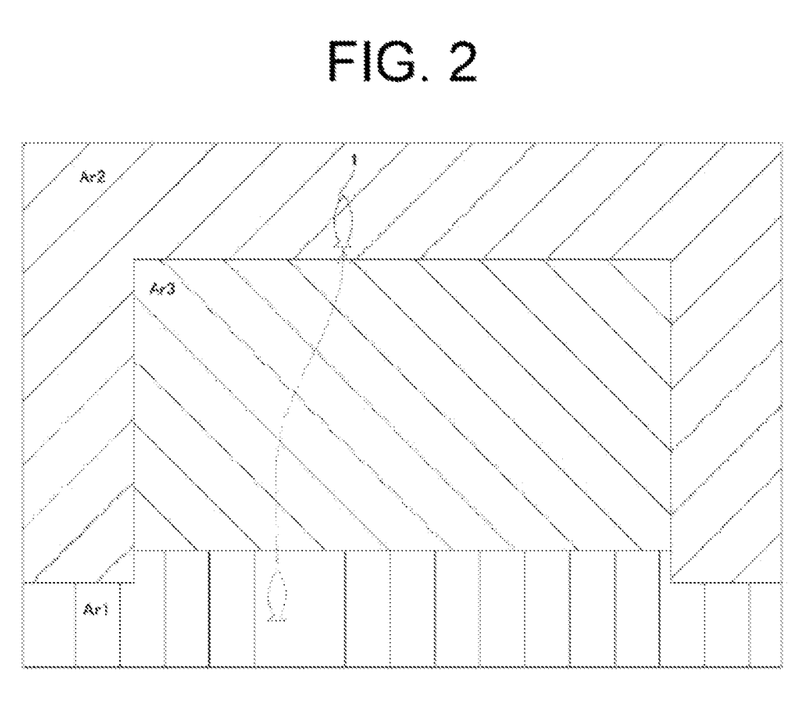
FIG. 2 is a diagram illustrating a captured image.

FIG. 2 is a diagram illustrating a captured image. The camera 2 is installed in a predetermined direction. As the predetermined direction, as shown in FIG. 2, a portion of a frame of the image is determined as a first region Ar1 and the other portion of the frame is determined as a second region Ar2 such that the first region Ar1 is closer to the first fish tank. By installing the camera 2 in such a predetermined direction, the fish moving from the first fish tank to the second fish tank always pass through the first region Ar1 before reaching the second region Ar2. In FIG. 2, one of the four sides is set as the first region Ar1, and the remaining three sides are set as the second region Ar2, but the setting is not limited to this.

In addition, since fish often pass through the center of the image, the imaging region has a third region Ar3 between the first region Ar1 and the second region Ar2. The third region Ar3 is located in a center portion of the image. With this arrangement, a fish 1 that leaves the first region Ar1 does not immediately reach the second region Ar2, and the fish 1 is captured in the third region Ar3 in a plurality of images. Therefore, the recognition accuracy may be improved. Note that the third region Ar3 may be omitted. As shown in FIG. 1, region setting data D1 associated with the first region Ar1, the second region Ar2, and the third region Ar3 is stored in a storage unit 39 in the system 3. An initial value may be set in the region setting data D1 or the region setting data D1 may be separately changeable by a user operation. In this embodiment, the region setting data D1 is a single file, and one region setting data D1 (1 file) is stored corresponding to one moving image D2.

As shown in FIG. 1, the fish counting system 3 includes an image acquisition unit 30, a counting unit 34, a result provision unit 36, a correction unit 37, a fish count change display provision unit 38, and the storage unit 39. Each of these units 30 to 38 is realized by the cooperation of hardware and software by executing a predetermined program on one or more processors included in a computer. The storage unit 39 is a memory or storage or the like.

The image acquisition unit 30 shown in FIG. 1 acquires a plurality of images by capturing the image capturing region in which a fluid including the fish 1 flows on a time-series basis. The camera 2 captures a moving image at, for example, 30 fps (Flames Per Second), and the moving image D2 is stored in the storage unit 39 of the system 3. The image acquisition unit 30 acquires a plurality of images from the moving image D2. The plurality of images are arranged in a time-series manner. In this specification, one image may be referred to as one frame.

The counting unit 34 shown in FIG. 1 counts the number of fish based on the plurality of images. The counting unit 34 is configured to count (add) the fish 1 when the fish 1 in the first region Ar1 has moved to the second region Ar2. Specifically, the counting unit 34 extracts fish by image processing from the individual images obtained in a time series, and assigns individual identification labels to the extracted fish to identify the individual fish based on locations of the fish in past images. Then, when fish having the same label as that assigned to the fish 1 in the first region Ar1 have reached the second region Ar2, the number of fish in the image (frame) at this time point is counted. This process is merely an example, and various algorithms may be employed as long as the number of fish can be counted.

As shown in FIG. 1, the counting unit 34 stores automatic counting data D3 indicating a counting result in the storage unit 39. In this embodiment, the automatic counting data D3 is a single file, and single automatic counting data D3 (1 file) is stored so as to correspond to a single moving image D2. In this embodiment, the automatic counting data D3 has the number of fish counted (added) for individual frames (individual images). In the example shown in FIG. 1, the automatic counting data D3 indicates that the number of fish counted in a j-th frame is +3, the number of fish counted in a j+1-th frame is +2, the number of fish counted in a j+2-th frame is +1, and the number of fish counted in a j+3-th frame is +4. Although j is a natural number, j is used for convenience of explanation.

Furthermore, the counting unit 34 also stores in the storage unit 39 mark data D4 indicating positions of count completion marks 61 (refer to FIG. 3) which indicate counted fish, for individual frames (refer to FIG. 1). The mark data D4 is used to display the count completion marks 61 (refer to FIG. 3) indicating counted fish in an image. In this embodiment, the marks are ROI (Region of Interest) indications, and rectangular frames are superimposed on images of the fish, but the marks are not limited to these, and marks of various shapes or colors may be employed. The fish that have passed through the first region Ar1 but have not reached the second region Ar2 and that have not been counted but are to be counted are represented by count target marks 68. The count completion marks 61 and the count target marks 68 have different colors.

Figure 3:
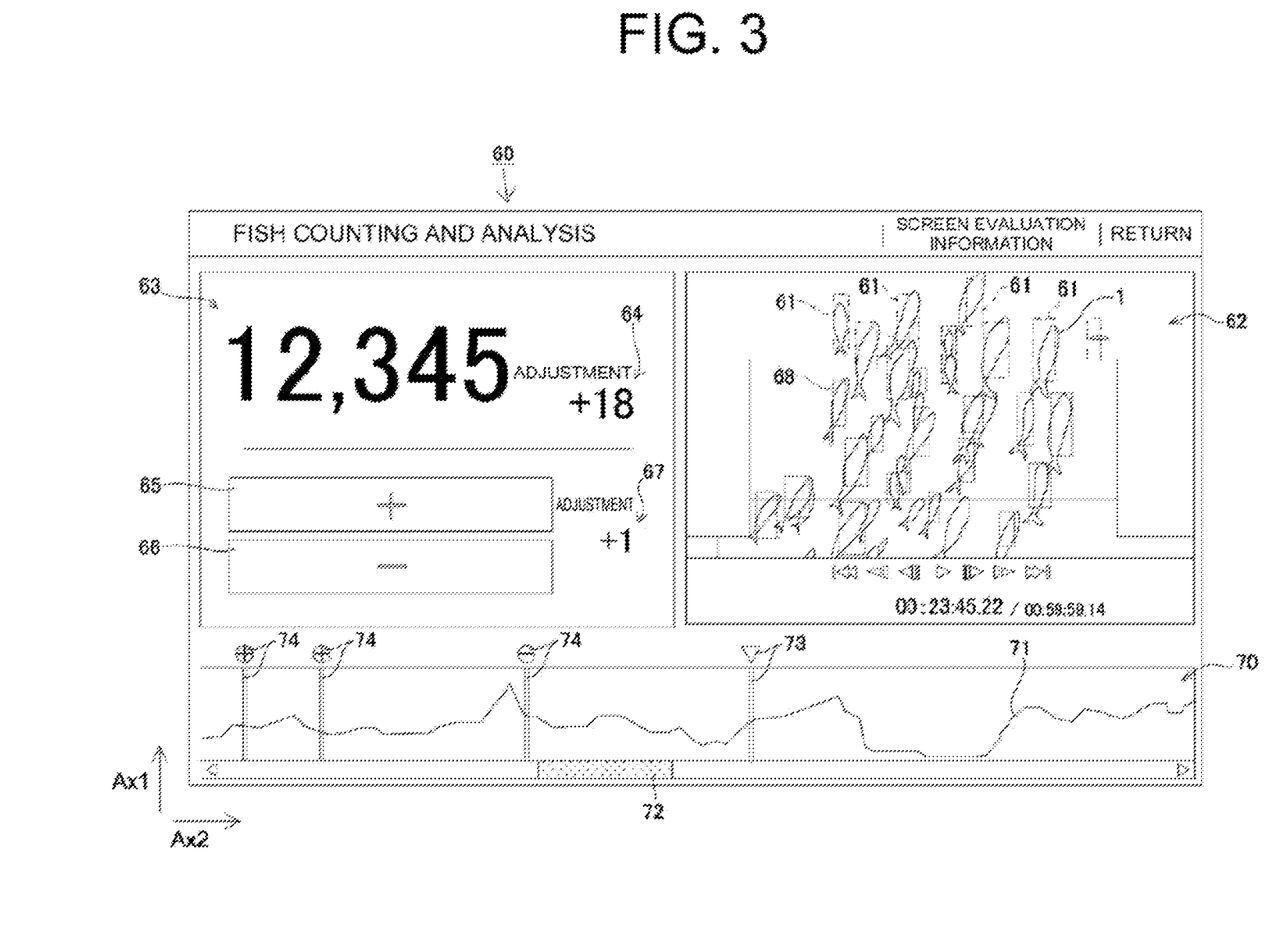
FIG. 3 is a diagram illustrating a screen including a counting result display and a fish count change display.

FIG. 3 is a diagram illustrating an example of a screen including a counting result display 60. The result provision unit 36 shown in FIG. 1 provides, as shown in FIG. 3, the counting result display 60 including an image 62 with the count completion marks 61 indicating counted fish. The count completion marks 61 are rectangular frames superimposed on the images of the fish indicated by dashed-dotted lines in FIG. 3, but are not limited to these. Various modifications may be made as long as the count completion marks 61 indicate ROI (Region of Interest). The counting result display 60 shown in FIG. 3 includes a total value 63 for an entire moving image (12345 in the figure), a correction value 64 for the entire moving image (+18 in the figure), and an addition instruction indication 65 and a subtraction instruction indication 66 for inputting a correction operation, and a correction value 67 for the number of fish in a current frame. The total value 63 in the entire moving image is obtained by aggregating the automatic counting data D3 shown in FIG. 1. Note that, in this screen, reproduction of a moving image (a plurality of images), pause, screen feeding in a unit of frame, screen reversing in a unit of frame, frame display with time specified, and a change in a reproduction portion with time specified may be performed.

The correction unit 37 shown in FIG. 1 accepts a correction operation and corrects the number of fish. In this embodiment, the correction unit 37 corrects the number of fish in accordance with an operation on the addition instruction indication 65 or the subtraction instruction indication 66. Specifically, when the addition instruction indication 65 is operated, the correction value 67 of the number of fish in the currently displayed image 62 (frame) is incremented by 1. The correction value 67 corresponds to the number of times the addition instruction indication 65 is operated. For example, when the addition instruction indication 65 is pressed p times, the correction value 67 is +p. p is a natural number equal to or larger than 1. Similarly, when the subtraction instruction indication 66 is operated, the correction value 67 of the number of fish in the currently displayed image (frame) is decremented by 1. The correction value 67 corresponds to the number of times the subtraction instruction indication 66 is operated. For example, when the subtraction instruction indication 66 is pressed p times, the correction value 67 is−p. Although p is a natural number, p is used for convenience of explanation.

The correction result (correction value 67) of the correction unit 37 is stored in the storage unit 39 as manual correction data D5 shown in FIG. 1. In this embodiment, the manual correction data D5 is a single file, and single manual correction data D5 (1 file) is stored so as to correspond to the single moving image D2. In this embodiment, the manual correction data D5 has correction values for individual frames (individual images). In the example shown in FIG. 1, the manual correction data D5 indicates that a manual correction value operated in av(j+)-th frame is +10, a manual correction value in a (j+100)-th frame is +10, a correction value in a (j+320)-th frame is−2. The correction value 64 for the entire moving image displayed in the screen of FIG. 3 is obtained by aggregating the manual correction data D5 shown in FIG. 3.

As shown in FIG. 1, the automatic counting data D3 represents the number of fish counted by the counting unit 34. The manual correction data D5 represents the number of fish corrected by the correction unit 37. The manual correction data D5 is different from the automatic counting data D3. The correction unit 37 changes the manual correction data D5 without changing the automatic counting data D3.

The fish count change display provision unit 38 shown in FIG. 1 provides the fish count change display 70 shown in FIG. 3. This change display 70 includes an indication 71 corresponding to the number of fish counted in a unit of time and the indication 71 is represented on a time-series basis. In this embodiment, as shown in FIG. 3, the fish count change display 70 includes the graph indication 71. In the graph indication 71, a first axis Ax1 that vertically extends corresponds to the number of fish counted per unit time, and a second axis Ax2 orthogonal to the first axis Ax1 corresponds to passage of time. In the example of FIG. 3, the left side represents the past and the right side represents the future along the second axis Ax2. The number of fish counted per unit time becomes greater along the first axis Ax1 from the bottom to the top. When a shooting time of the moving image D2 is too long to fit on a single screen, a slider bar 72 is displayed and any time point may be displayed by sliding the slider bar 72. Furthermore, when a time point to be viewed in the change display 70 is operated, a frame at the time point specified by the operation is displayed. Although the first axis Ax1 extends in the vertical direction in this embodiment, the first axis Ax1 may extend in the horizontal direction. In this embodiment, the unit time is time corresponding to one frame, since the total value is managed for each frame. 30 fps corresponds to ⅓₀ second. This is merely an example, and time corresponding to a plurality of frames may be used as the unit time.

In the example shown in FIG. 3, the number of fish counted per unit time is shown in a line graph, but this is only one example and various modifications may be made. For example, various types of graphs, such as a bar graph, may be employed. Numbers serving as total values may be arranged in chronological order.

In this way, since the indication 71 corresponding to the numbers of counted fish is arranged in a time series, a time point when miscounting is likely to occur (a time point when the total value is large) may be recognized by viewing the indication 71 without viewing images for all the time. In addition, when the graph indication 71 is used, time points of large total values may be easily recognized since peaks of the graph and its surroundings mean time points of large total values.

The fish count change display 70 shown in FIG. 3 includes a current indication 73 representing a time point of the currently displayed image 62 (frame). Furthermore, the fish count change display 70 includes a correction time point indication 74 indicating a time point when correction is performed using the addition instruction indication 65 or the subtraction instruction indication 66. The correction time point indication 74 indicates not only the time point but also content of the correction value (addition or subtraction).

Operation Flow

Figure 4:
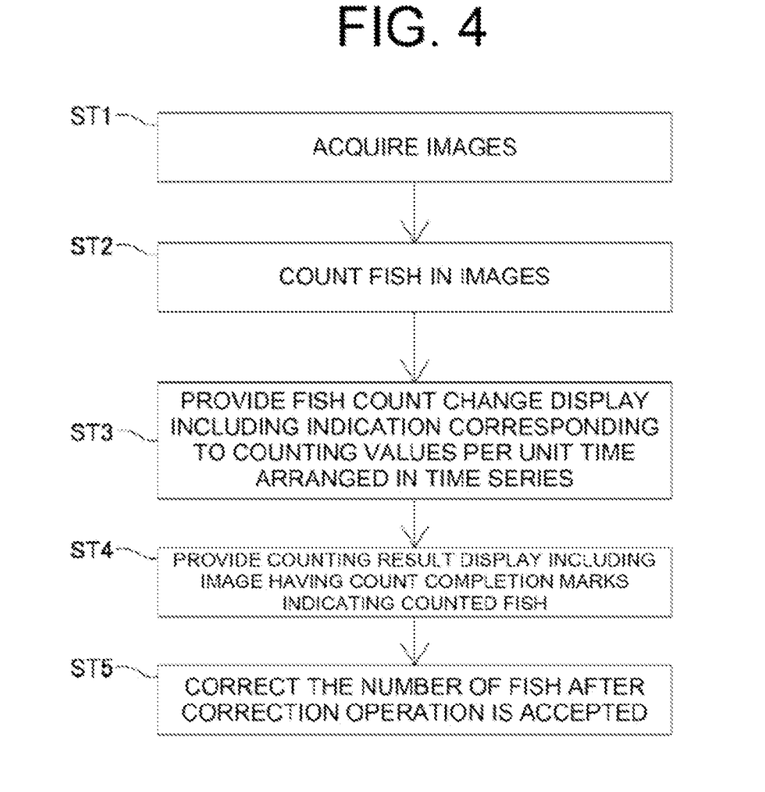
FIG. 4 is a flowchart of an example of a process performed by the system.

A process performed by the system 3 will be described with reference to FIG. 4. The moving image D2 is stored in the storage unit 39. When a predetermined analysis start condition is satisfied, such as an analysis instruction operation being performed or storage of a new moving image D2 in the storage unit 39, the image acquisition unit 30, based on the moving image D2, acquires a plurality of images of fluid including fish captured over time in step ST1 of FIG. 4. In step ST2, the counting unit 34 counts the number of fish based on the plurality of images. Results of the counting are stored in the storage unit 39 as the automatic counting data D3 and the mark data D4 shown in FIG. 1. When a fish count and analysis screen shown in FIG. 3 is opened, in next step ST3, the fish count change display provision unit 38 provides, based on the automatic counting data D3 and the mark data D4 shown in FIG. 1, the fish count change display 70 including the indication 71 corresponding to the number of fish counted per unit time arranged in a time series (refer to FIG. 3). Furthermore, in step ST4, the result provision unit 36 provides, as shown in FIG. 3, the counting result display 60 including the image 62 including the count completion marks 61 indicating counted fish. Step ST4 may be repeatedly executed in response to reproduction of the moving image D2 or a designation of a time point in the fish count change display 70. When the addition instruction indication 65 or the subtraction instruction indication 66 shown in FIG. 3 is operated, the correction unit 37 accepts a correction operation so as to correct the number of fish in step ST5. The correction unit 37 stores a result of the correction as the manual correction data D5 in the storage unit 39.

First Modification

Figure 5:
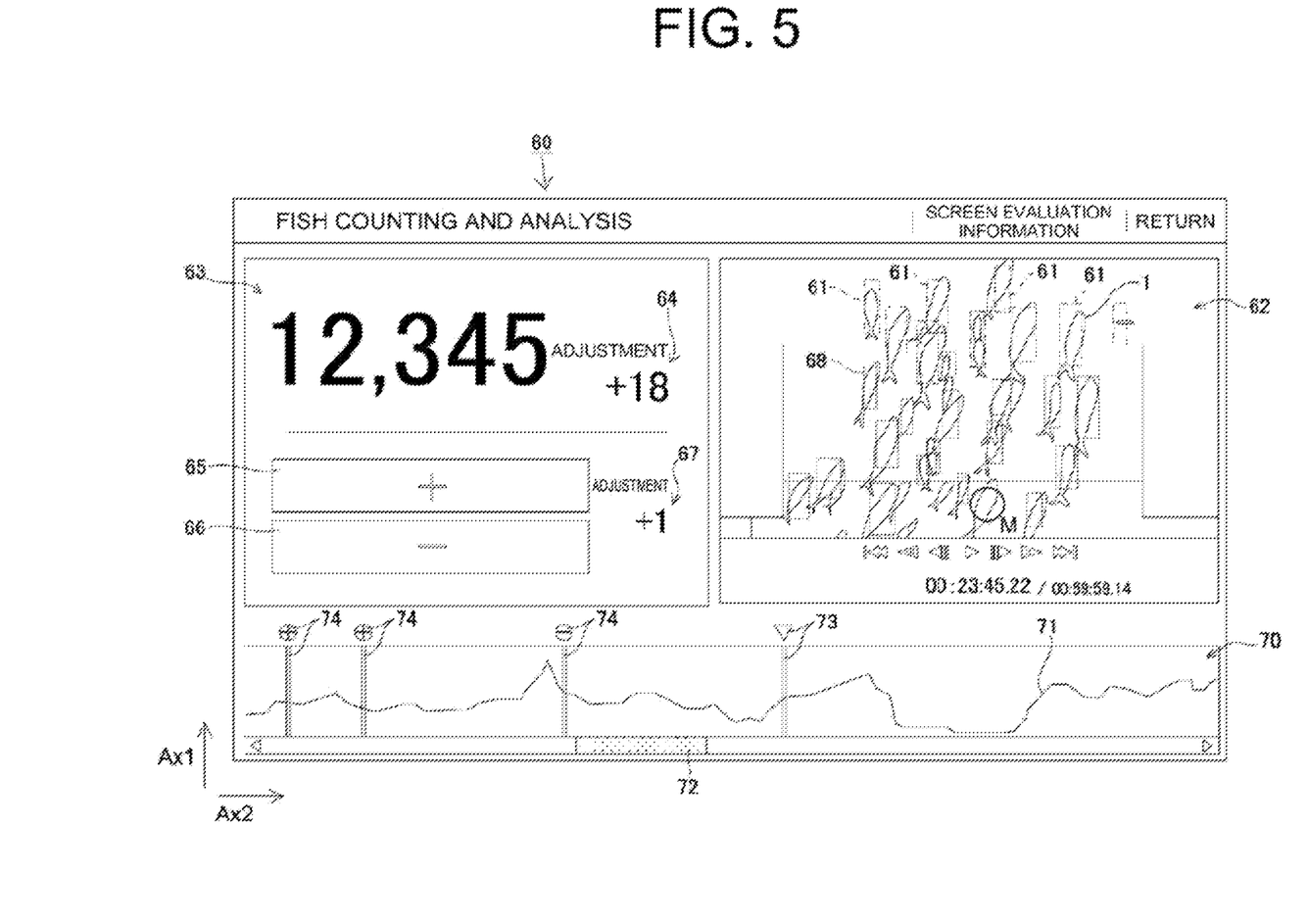
FIG. 5 is a diagram illustrating a screen including an image with a manual correction mark.

In the embodiment shown in FIG. 3, the number of fish in the image 62 (frame) being displayed is corrected by simply operating the addition instruction indication 65 or the subtraction instruction indication 66, but the correction is not limited to this. As a time-consuming but highly accurate method of correction, positions of fish that have been miscounted or that are to be counted in the image 62 may be specified to perform an additive or subtractive correction operation. Examples of the method for specifying positions of fish include a method for specifying positions by enclosing the fish in rectangular frames and a method for specifying coordinates in the image 62. It is preferred that the result provision unit 36 provides an image with a manual correction mark indicating the corrected fish specified in the correction operation along with the count completion marks 61. Since a basis for the correction is thus displayed together with the image 62 by means of the manual correction mark, the number of fish is appropriately managed. FIG. 5 is a diagram illustrating an example of a screen including the image 62 with a manual correction mark M.

Second Modification

Figure 6:
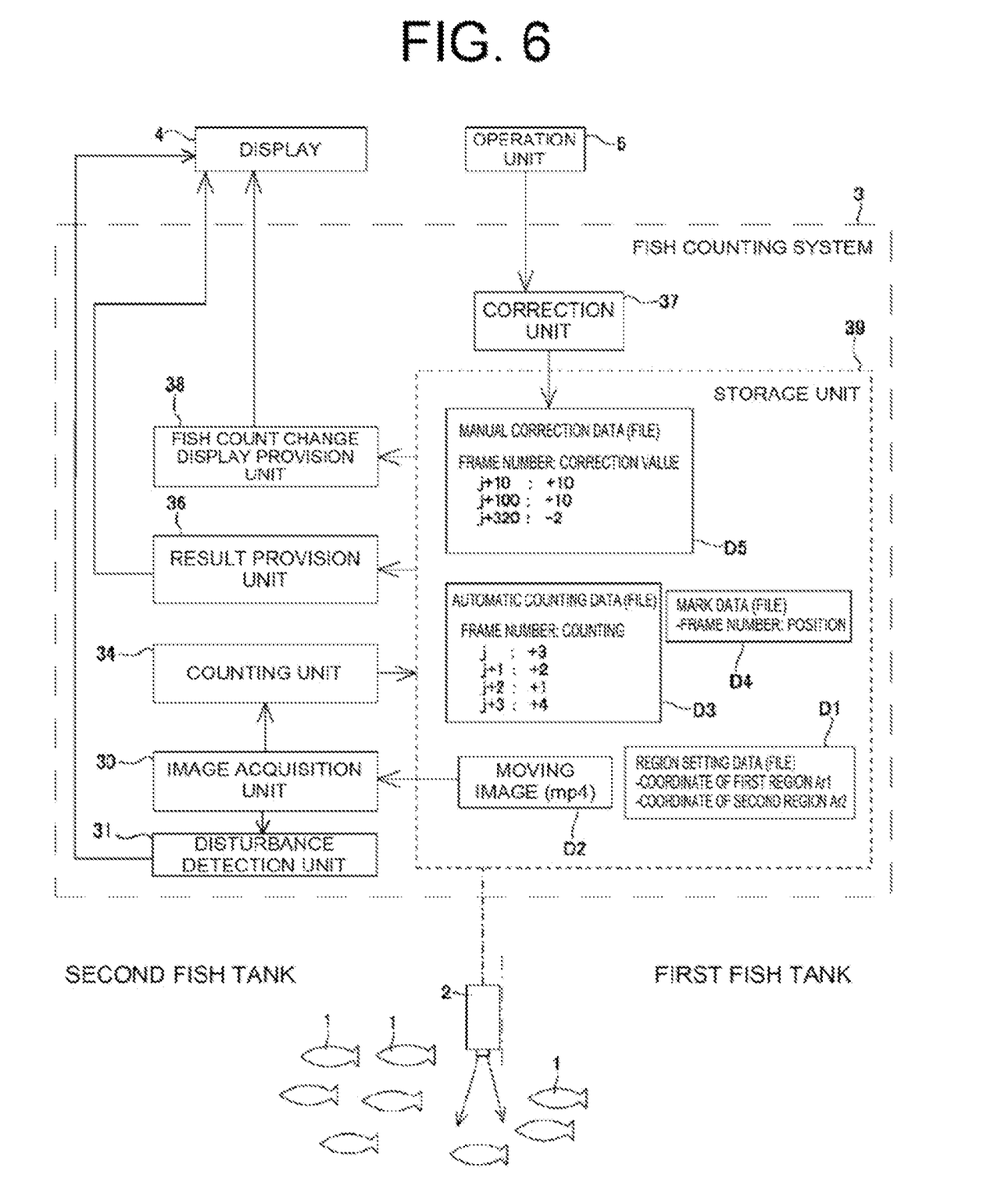
FIG. 6 is a diagram schematically illustrating another configuration of the fish counting system.

FIG. 6 is a diagram schematically illustrating another configuration of the fish counting system 3 according to this embodiment. In addition to the configuration of FIG. 1, the fish counting system 3 may further include a disturbance detection unit 31. Similarly to the image acquisition unit 30 and the like, the disturbance detection unit 31 is also realized by the cooperation of hardware and software when one or more processors included in the computer execute a predetermined program.

The disturbance detection unit 31 detects a disturbance based on an image acquired by the image acquisition unit 30. Then, the disturbance detection unit 31 provides a marking indication 75 at a time point when the disturbance detection unit 31 detects the above disturbance in the fish count change display 70 arranged in the time series (refer to FIG. 7). At this time, the disturbance detection unit 31 may provide, in addition to the marking indication 75 described above, a disturbance content display 76 (see FIG. 7).

Here, the disturbance detection unit 31 detects a disturbance in the following manner for each type of disturbance (evaluation item).

When "reflection of direct sunlight" is detected as a disturbance (when the evaluation item is "reflection of direct sunlight"), the disturbance detection unit 31 divides an image acquired by the image acquisition unit 30 into blocks. Specifically, a small region that is $1/12$ of the screen in both length and width is shifted vertically and horizontally by $1/24$ of the screen in length and width, so that an image acquired by the image acquisition unit 30 is divided into 23×23 blocks. When there is a block in which an average of brightness is equal to or larger than a certain value, an average of hue is equal to or smaller than a certain value, and averages of R (red), G (green), and B (blue) are individually equal to or larger than a threshold value, the disturbance detection unit 31 determines that there is a reflection of direct sunlight (detects a disturbance).

When "reflection of an obstacle, such as a net or a structure" is detected as a disturbance (when the evaluation item is "reflection of an obstacle"), the disturbance detection unit 31 divides an image acquired by the image acquisition unit 30 into 4×4 blocks at equal intervals. Then, first, a block having an average of brightness that is equal to or smaller than a certain value is determined as an obstacle candidate region. Subsequently, blocks that are adjacent to the obstacle candidate region and that are not an obstacle candidate region are determined as candidates of a "boundary with a sea surface". When a number of blocks of candidates of a "boundary with a sea surface" in which variance of brightness is not less than a certain value is equal to or larger than a half of a number of blocks adjacent to the obstacle candidate region, the disturbance detection unit 31 determines that a boundary between an obstacle and the sea surface exists and the obstacle is reflected (detects a disturbance).

When detecting "reflection of a floating object or the like" as a disturbance (when the evaluation item is "reflection of a floating object or the like"), the disturbance detection unit 31 grayscales an entire image acquired by the image acquisition unit 30, and thereafter, binarizes individual pixels to extract contours so as to calculate areas of individual regions surrounded by the contours. When the number of regions having an area within a certain range is not less than a certain value, the disturbance detection unit 31 determines that a floating object or the like has been reflected (detects a disturbance).

In a case of detecting "overall brightness and darkness in an image" as a disturbance (when the evaluation item is "overall brightness and darkness"), when the brightness of an entire screen of an image acquired by the image acquisition unit 30 is not less than a certain value, the disturbance detection unit 31 determines that the entire image is too bright (detects a disturbance). Conversely, when the brightness of the entire screen of the image acquired by the image acquisition unit 30 is less than the certain value, the disturbance detection unit 31 determines that the entire image is too dark (detects a disturbance).

Figure 7:
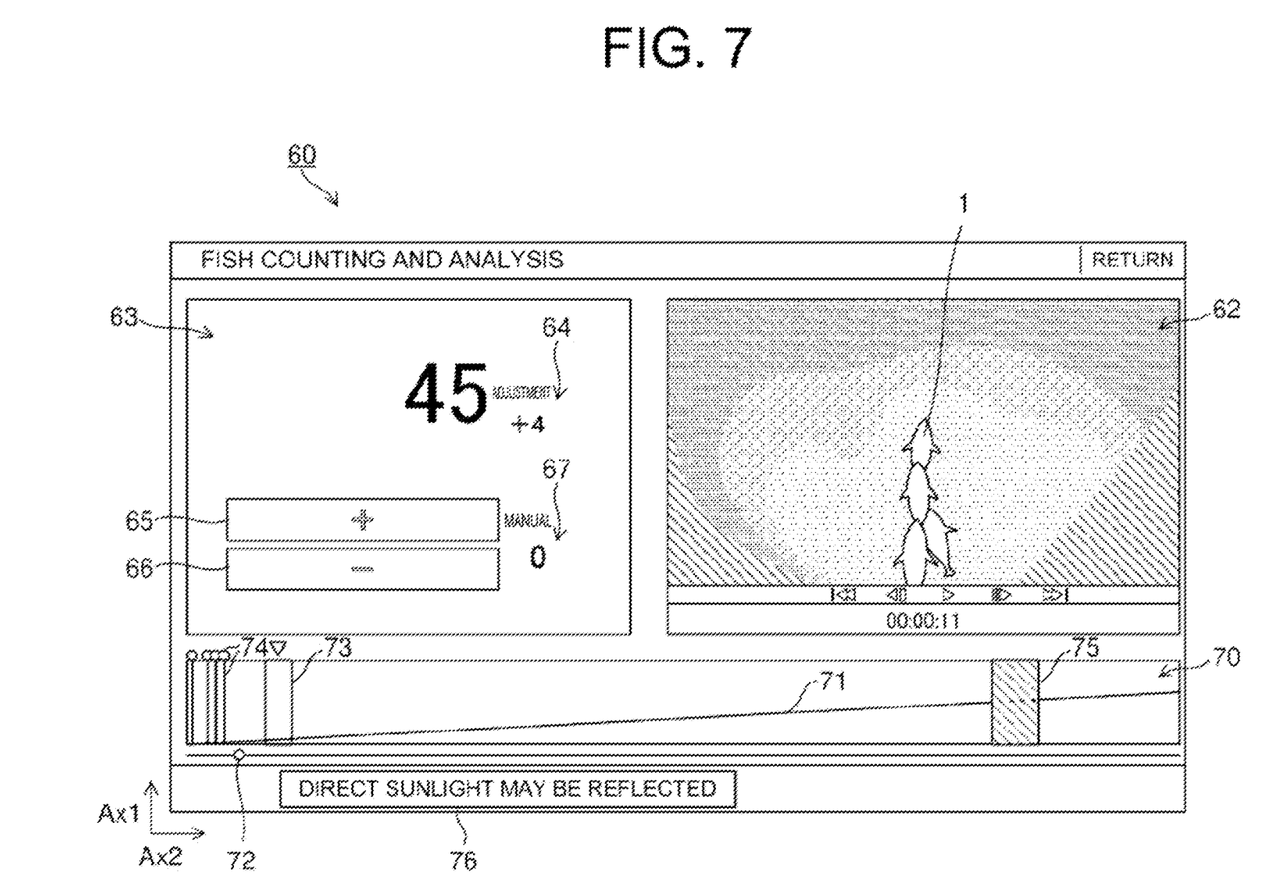
FIG. 7 is a diagram illustrating another example of the screen including a counting result display and a fish count change display.

FIG. 7 is a diagram illustrating another example of the screen including a counting result display 60 and a fish count change display 70. The figure shows a state in which a marking indication 75 is attached to a time point when the disturbance detection unit 31 detects a disturbance in the fish count change display 70. When there is a disturbance, such as a reflection of direct sunlight, the counting unit 34 may not correctly count the number of fish based on an image. Since the marking indication 75 is attached to the time point when the disturbance detection unit 31 detects a disturbance in the fish count change display 70 displayed in a time series, miscounting caused by the disturbance may be corrected in accordance with a correction operation based on the marking indication 75.

Furthermore, in the fish count change display 70 in FIG. 7, in addition to the above marking indication 75, a disturbance content display 76 indicating content of the disturbance detected by the above detection method is attached. When the disturbance content display 76 is displayed, miscounting caused by a disturbance may be corrected in accordance with the content of the disturbance (i.e., a degree of correction may be differentiated in accordance with the content of the disturbance), and accordingly, the miscounting may be accurately corrected in accordance with the disturbance.

As described above, the fish counting system 3 according to the present disclosure includes the image acquisition unit 30 that acquires a plurality of images of fluid including fish captured over time, the counting unit 34 that counts the number of fish based on the plurality of images, the fish count change display provision unit 38 that provides the fish count change display 70 in which an indication 71 corresponding to the number of fish counted per unit time is arranged in a time series, the result provision unit 36 that provides the counting result display 60 including the image 62 with a count completion mark 61 indicating a counted fish, and the correction unit 37 that accepts a correction operation and corrects the number of fish.

The fish counting method according to this embodiment includes acquiring a plurality of images of a fluid including fish captured over time, counting the number of fish based on the plurality of images, providing a fish count change display in which an indication corresponding to the number of fish counted per unit time is represented in a time series, providing a counting result indication including an image with a count completion mark indicating a counted fish, and accepting a correction operation and correcting the number of fish.

Miscounting is most likely to occur when a large number of fish pass through at once, and therefore, the number of fish counted per unit time is large. This configuration provides a fish count change display 70 in which the indication 71 corresponding to the number of fish counted per unit time is represented in a time series. Accordingly, a time point when miscounting is likely to be performed since a large number of fish pass at once may be recognized without visually inspecting images for all the time. Then, the counting result display 60 including an image with the count completion mark 61 indicating a counted fish is visually checked so that correction is enabled by a correction operation. Accordingly, miscounting may be easily corrected.

As described in this embodiment, the fish count change display 70 preferably has the graph indication 71 having the first axis Ax1 that extends horizontally or vertically and that corresponds to the number of fish counted per unit time and the second axis Ax2 that is orthogonal to the first axis Ax1 and that corresponds to passage of time.

With the graph indication 71, when a change in the graph indication 71 is viewed, a time point when miscounting is likely to occur may be easily recognized, and therefore, correction may be easily performed. Examples of the time point when miscounting is likely to occur include peaks and sudden rises.

As in this embodiment, the result provision unit 36 preferably provides, together with the image 62 with the count completion marks 61 indicating counted fish, the addition instruction indication 65 and the subtraction instruction indication 66 for instructing a correction of the number of fish, and the correction unit 37 preferably corrects the number of fish in response to an operation to the addition instruction indication 65 or the subtraction instruction indication 66.

With this configuration, the addition instruction indication 65 or the subtraction instruction indication 66 may be operated when the image 62 with the count completion marks 61 is visually viewed and a counting omission in which the count completion mark 61 is not assigned or miscounting in which the count completion mark 61 is mistakenly assigned is recognized, and accordingly; efficiency of the correction operation may be improved.

As in the first modification of this embodiment, the correction unit 37 corrects the number of fish when accepting a correction operation that involves specifying a position of a corrected fish in the image 62, and the result provision unit 36 provides the image 62 with the manual correction mark M indicating a corrected fish specified in the correction operation.

Accordingly, since a basis for the correction is thus displayed together with the image 62 by means of the manual correction mark M, the number of fish may be appropriately managed.

As in this embodiment, the fish count change display 70 preferably includes the correction time point indication 74 indicating a time point when the number of fish has been corrected.

According to this configuration, since the correction time point indication 74 is displayed together with the indication 71 corresponding to the number of fish counted per unit time, it may be easily recognized whether correction has already been made for a time point when miscounting is likely to occur, and accordingly, convenience may be improved. Moreover, when a plurality of persons perform the correction of miscounting, a portion corrected by one of the persons first may be easily recognized, and accordingly, the plurality of persons may efficiently perform a check operation and a correction operation.

As in this embodiment, the fish counting system 3 preferably includes the storage unit 39. The storage unit 39 preferably stores the automatic counting data D3 representing the number of fish counted by the counting unit 34 and the manual correction data D5 that is different from the automatic counting data D3 and that represents the number of fish corrected by the correction unit 37. The correction unit 37 preferably changes the manual correction data D5 without changing the automatic counting data D3.

With this configuration, since the automatic counting data D3 is not degraded by the correction, restoration may be easily performed even in a case of an erroneous correction.

As in the second modification of this embodiment, it is preferable that the fish counting system 3 further includes the disturbance detection unit 31 that detects a disturbance based on an image acquired by the image acquisition unit 30. The fish count change display 70 preferably has the marking indication 75 indicating a time point when the disturbance detection unit 31 detects a disturbance. In this case, the miscounting caused by the disturbance may be corrected in accordance with the correction operation based on the marking indication 75.

The fish count change display 70 preferably has the disturbance content display 76 that indicates detected content of the disturbance. In this case, the correction according to the content of the disturbance may be performed in accordance with a correction operation based on the disturbance content display 76. Accordingly, correction may be accurately performed on miscounting caused by a disturbance.

A program according to this embodiment causes one or more processors to execute the method described above. In addition, a computer readable transitory recording medium according to this embodiment stores the program described above.

Although each of the units 30 to 38 shown in FIG. 1 is realized by executing a predetermined program by one or more processors, each of the units may be configured by a dedicated memory or a dedicated circuit.

In the system 3 of the embodiment above, although each of the units 30 to 38 is realized by a processor of a computer, each of the units 30 to 38 may be distributed and implemented by a plurality of computers or a cloud. That is, the above method may be performed by one or more processors.

Although embodiments of the present disclosure have been described above with reference to the drawings, the specific configurations should not be considered to be limited to these embodiments. The scope of the present disclosure is defined not only by the description of the above embodiments but by the scope of the claims, and further, all modifications that fall within a meaning and scope equivalent to the scope of the claims are included.

INDUSTRIAL APPLICABILITY

The present invention can be employed in fish counting systems.

DESCRIPTION OF REFERENCE NUMERALS 1 fish
3 fish counting system
30 image acquisition unit
34 counting unit
36 result provision unit
37 correction unit
38 fish count change display provision unit
39 storage unit
61 count completion mark
65 addition instruction indication
66 subtraction instruction indication
70 fish count change display
71 graph indication
74 correction time point indication
Ax1 first axis
Ax2 second axis D3 automatic counting data
D5 manual correction data

The invention claimed is:

1. A fish counting system comprising:
an image acquisition unit configured to acquire a plurality of images of a fluid including fish captured over time;
a counting unit configured to count a number of fish in the fluid based on the plurality of images;
a fish count change display provision unit configured to provide a fish count change display in which an indication corresponding to a rate at which the number of fish are counted per unit time is arranged in a time series;
a result provision unit configured to provide a counting result display including an image with a count completion mark indicating a counted fish; and
a correction unit configured to accept a correction operation and corrects the number of fish.

2. The fish counting system according to claim 1, wherein the fish count change display has a graph indication having a first axis extending horizontally or vertically corresponding to the rate at which the number of fish are counted per unit time and a second axis that is orthogonal to the first axis and that corresponds to a passage of time.

3. The fish counting system according to claim 1, wherein:
the result provision unit is further configured to provide, together with an image with a count completion mark indicating a counted fish, an addition instruction indication and a subtraction instruction indication for instructing a correction of the number of fish, and
the correction unit is further configured to correct the number of fish in response to an operation to the addition instruction indication or the subtraction instruction indication.

4. The fish counting system according to claim 1, wherein:
the correction unit corrects the number of fish when accepting a correction operation that involves specifying a position of a fish to be corrected in the image, and
the result provision unit provides an image with a manual correction mark indicating the fish to be corrected specified in the correction operation.

5. The fish counting system according to claim 1, wherein the fish count change display has a correction time point indication indicating a time point when the number of fish is corrected.

6. A fish counting system according to claim 1, comprising:
a storage unit configured to store automatic counting data representing the number of fish counted by the counting unit and manual correction data that is different from the automatic counting data and that represents the number of fish corrected by the correction unit, and
wherein the correction unit is further configured to change the manual correction data without changing the automatic counting data.

7. The fish counting system according to claim 1, further comprising:
a disturbance detection unit configured to detect a disturbance based on the image acquired by the image acquisition unit, and
wherein the fish count change display has a marking indication indicating a time point when the disturbance detection unit detects the disturbance.

8. The fish counting system according to claim 7, wherein the fish count change display includes a disturbance content display indicating detected content of the disturbance.

9. A fish counting method comprising:
acquiring a plurality of images of a fluid including fish captured over time;
counting a number of fish in the fluid based on the plurality of images;
providing a fish count change display in which an indication corresponding to a rate at which the number of fish are counted per unit time is arranged in a time series;
providing a counting result display including an image with a count completion mark indicating a counted fish; and
accepting a correction operation and correcting the number of fish.

10. A non-transitory, computer-readable medium storing instructions, which when executed by one or more processors, causes the one or more processors to perform the fish counting method according to claim 9.

11. The fish counting system according to claim 2, wherein:
the result provision unit is further configured to provide, together with an image with a count completion mark indicating a counted fish, an addition instruction indication and a subtraction instruction indication for instructing a correction of the number of fish, and
the correction unit is further configured to correct the number of fish in response to an operation to the addition instruction indication or the subtraction instruction indication.

* * * * *